United States Patent [19]
Guglielmi

[11] Patent Number: 5,217,515
[45] Date of Patent: Jun. 8, 1993

[54] ABATEMENT OF TINKLES IN WIRE MESH

[75] Inventor: Geno J. Guglielmi, Grand Prairie, Tex.

[73] Assignee: Glitsch, Inc., Dallas, Tex.

[21] Appl. No.: 772,519

[22] Filed: Oct. 7, 1991

[51] Int. Cl.$^5$ .............................. B01D 46/00
[52] U.S. Cl. .................. 55/526; 55/DIG. 43; 55/524; 280/740
[58] Field of Search ......... 55/525, 526, 524, DIG. 43; 280/736, 737, 740, 741, 742, 728; 140/71 C

[56] References Cited

U.S. PATENT DOCUMENTS

| | | | |
|---|---|---|---|
| 2,334,263 | 11/1943 | Hartwell | 55/526 |
| 3,780,872 | 12/1973 | Pall | 55/525 |
| 5,064,459 | 11/1991 | Underforsthuber | 55/526 |

Primary Examiner—Bernard Nozick
Attorney, Agent, or Firm—Marvin A. Naigur

[57] ABSTRACT

Method and product made for preventing loose tinkles in a wire mesh product. Opposite ends of a sock of knitted wire mesh are subjected to a single-ply bonding operation such as electric resistance welding, thereby bonding the tinkles to the mesh. The sock is then compressed to produce a foraminous product suitable for use as a slag filter in automotive airbag assemblies.

2 Claims, 2 Drawing Sheets

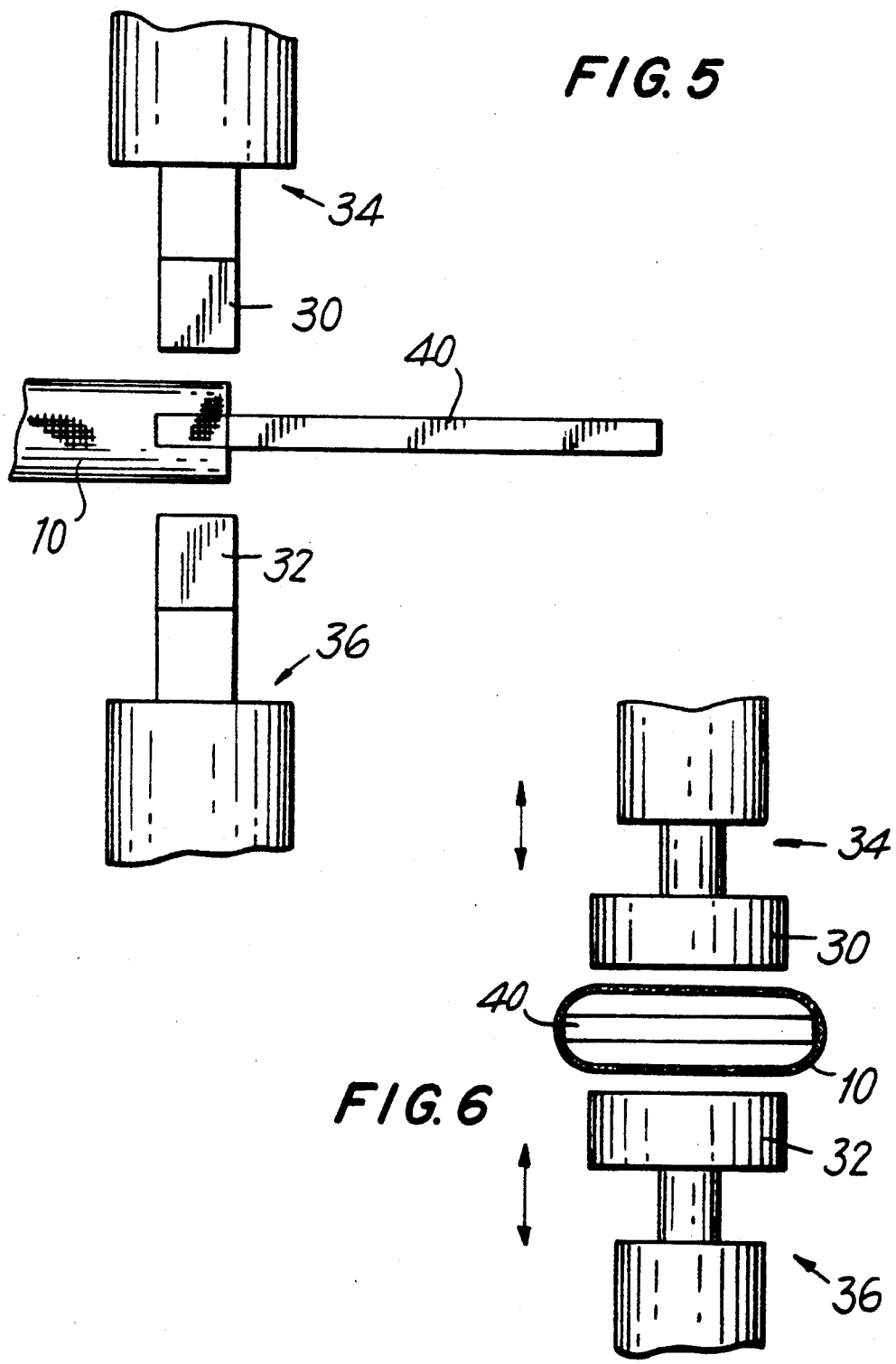

ABATEMENT OF TINKLES IN WIRE MESH

FIELD OF THE INVENTION

The present invention relates to the abatement of tinkles in wire mesh. Tinkles are produced when wire mesh is cut. The method provides a way of dealing with tinkles by bonding the tinkles to the mesh. The current invention also provides an improved product that is free of unbonded tinkles and that is useful as a slag filter in automotive airbags.

BACKGROUND OF THE INVENTION

It is known to place a circular preform of knitted metallic wire mesh in a compression die and to compress the preform longitudinally or radially, or both, to produce a shaped product. Such known methods frequently begin with the production of a mesh sock on a circular knitting machine. The sock might be cut, flattened and wound, perhaps together with other material such as graphite, into a spiral preform to provide the desired thickness of a final product. A description of an improved process of this type, and product made, including a detailed discussion of the compression step and compression die, may be found in commonly-owned copending U.S. patent application Ser. No. 07/661,282 now abandoned, filed Feb. 26, 1991. That application is hereby incorporated by reference.

In the past, it has been known to produce a slag filter for an automotive airbag by longitudinally compressing a single-ply sock of knitted wire mesh in a compression die. By "compressing a single-ply sock" is meant that the sock is not first flattened to produce a two-ply item, as has been common in the past. Instead, the continuous cylindrical mesh as-produced on a circular knitting machine is cut into lengths and placed as-is in the compression die.

The result has been a foraminous article that has been useful as a slag filter in automotive airbag assemblies. A slag filter is interposed in the flow path between the inflatable airbag on the one hand and, on the other hand, the explosive mixture that produces the gas used to inflate the airbag. The explosive mixture traditionally produces gas and molten metal called slag. The slag filter made from the compressed knitted wire mesh allows the inflating gas to pass freely but cools and traps molten metal.

When knitted wire mesh is cut, it results in the production of loose pieces of scrap commonly known in the wire knitting industry as tinkles. The material making up the tinkles had formally been a portion of the knit. In other words, a tinkle is a knitted loop, or a portion of a knitted loop, which has been cut. Tinkles are of irregular shape and distribution and have no predetermined location, size or shape. However, they do tend to remain near the cut line where they were formed.

In some contexts, tinkles create potential problems when they adhere to a continuous piece of wire mesh. One current method of removing tinkles is to try to shake them off the mesh sleeve or to pick them off by hand. Such methods are very labor-intensive, do not lend themselves to automation, and are subject to human error.

In the past, the present inventor successfully prevented the formation of loose tinkles in the fabrication of an aircraft wing tank gasket which required that a mounting hole be punched in the gasket. The gasket was produced from a spirally wound preform, which was then compressed to produce the overall substantially flat shape of the gasket. An electric resistance welding operation was conducted in the vicinity where the mounting hole was to be punched. This step successfully welded the adjacent plies of compressed mesh loops to each other in the vicinity of the weld. Any tinkles that were produced were bonded to the metallic structure and could not shake loose to do damage.

Such use of bonding has not heretofore carried over into the production of slag filters for automotive airbags. One possible reason is the need for great dimensional regularity in such filters. Carrying out a welding operation on such a filter might lead to a stiffer portion and resulting dimensional irregularity such as a raised band extending circumferentially of the filter near its opposite ends, where the tinkles congregate and where the bonding would be carried out.

So far as is known, before the current invention no one had considered the possibility of performing a welding or other bonding operation before compression. This would have been counter-intuitive, because the very act of compression might be thought to break the individual bonds. Moreover, when the fabrication of the product begins with continuous cylindrical mesh, as from a circular knitting machine, it is not apparent how one could weld the mesh in advance (before cutting) to prevent the initial formation of tinkles, as was done in the case of the hole to be punched in the airplane gasket. Therefore, so far as is known, tinkles have been present in airbag slag filters in the past, and have not been bonded to the filter.

As the design of automotive airbags has become increasingly critical over time, it has become even more necessary to provide the above-noted dimensional regularity in slag filters. Also, it has become increasingly desirable for the slag filters to be free of loose or potentially loose tinkles. Such tinkles might be captured in the final product by being mechanically held in the product. However, being unbonded, they have the potential to become free. It is thought that such tinkles can damage fragile airbag components during assembly and also during the life of the vehicle (as from vibration during use).

It is an object of the current invention to provide a method for the abatement of tinkles in a wire mesh product, and especially while maintaining high dimensional regularity of the product.

It is a further object of the current invention to provide a method for controlling tinkles in a product formed by compressing a single cylindrical ply of knitted wire mesh of the type produced on a circular knitting machine.

A still further object is to provide a product made from a compressed single ply of knitted wire mesh, being free of unbonded tinkles and being suitable for use as a slag filter as above-described.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accord with the present invention when taken in conjunction with the accompanying drawings wherein:

FIGS. 5 and 6 respectively are front and end views of an electric resistance welding operation according to the current invention.

DESCRIPTION OF THE PREFERRED EMBODIMENT

Figure 1:
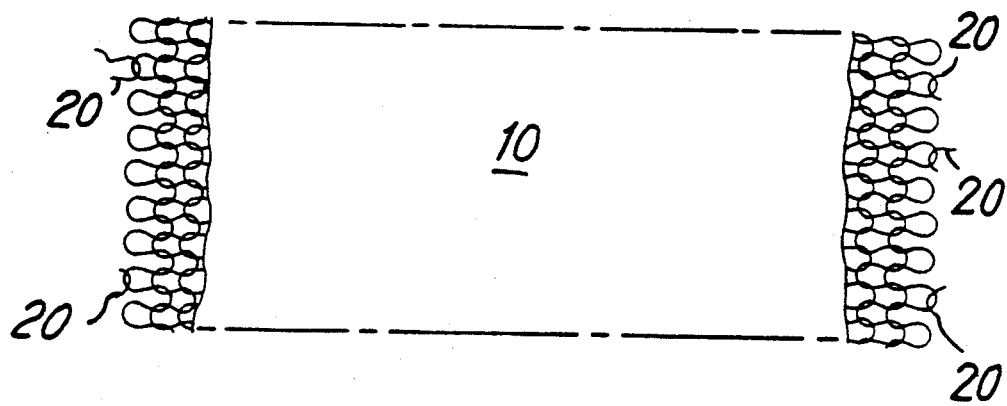
FIG. 1 shows the details of opposite ends of a sock that has been cut from a continuous length of cylindrical knitted wire mesh.

FIG. 1 shows a sock 10 that has been cut from a continuous length of knitted metallic wire mesh as produced on a circular knitting machine. Because the sock is cylindrical, the opposite face or side of the sock normally would be visible through the mesh. For clarity, only one side is shown in the drawing.

In the presently preferred embodiment, the sock is knitted from type 304 or 316 stainless steel having a diameter of 0.020 inch. The knit is a Jersey knit. It is likely that other compositions and knits will work so long as the material can be bonded, as by a welding operation such as described herein. For producing an airbag filter of the type described herein, a typical sock may have a length of about 4.75 inches and a diameter of about two inches.

Figure 2:
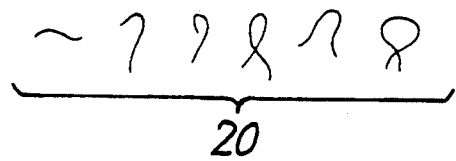
FIG. 2 shows representative examples of tinkles.

As is known, the sock will have been produced by transversely severing the length of mesh along cut lines respectively disposed at left and right ends in FIG. 1. The transverse cuts have produced tinkles 20, enlarged examples of which may be shown in FIG. 2. The illustrated embodiments of tinkles are representative only.

Tinkles are portions of cut knit loops. They do not have a characteristic size or shape. Indeed, the act of cutting the mesh can distort the wire to produce shapes not found in the original knit.

According to the current invention, a single-ply bonding operation is next carried out around the circumference of the sock 10 in the vicinity of the cut lines. A single-ply bonding operation is one which operates on individual plies of the sock. In the current invention, the purpose of the bonding operation is to bond the tinkles 20 to the sock. More particularly, in the single-ply bonding operation, a tinkle becomes bonded to one and only one ply, and adjacent plies do not become bonded to each other.

In the absence of this bonding operation, the tinkles 20 would remain unbonded, and it is an object of the current invention to provide an article that is free of unbonded tinkles. It is true that, in the absence of a bonding operation, some or all of the tinkles might, by chance, become mechanically captured by the compression step that forms the desired product. However, such capture might be temporary. An unbonded tinkle has the potential to work loose.

A presently-preferred example of a single-ply bonding operation is an electric resistance welding operation. In this regard, FIGS. 5 and 6 show conventional upper and lower electrodes 30, 32 of a conventional electric resistance welding machine having upper and lower members schematically represented by reference numerals 34 and 36. As is known in the art, the electrodes 30, 32 are movable toward and away from each other.

According to the current invention, an electrically conductive member 40 is inserted into the sock 10, as shown. The electrically conductive member has a lower electrical resistivity than does the sock. Where the sock is fabricated from stainless steel, the electrically conductive member may suitably be made of copper.

With the electrically conductive member 40 disposed in the sock as shown, the electrodes 30, 32 are moved toward each other until a conductive path involving the sock and the electrically conductive member is established between the two electrodes. Then, a suitable current is passed between the electrodes to perform the electric resistance welding. The voltage and duration of the current is chosen such that welds do not form between the sock and the electrically conductive member.

It may be seen that a single ply of the sock 10 is placed between an electrode (e.g. 30) on the outside of the sock and the electrically conductive member within the sock. In this manner, it is possible to perform a single-ply welding operation.

In the illustrated procedure, two single-ply welding operations are carried out simultaneously, each operation involving a different electrode and different portions of the circumference of the sock. Variations of the procedure are possible in which this does not occur.

The welding operation should be carried out around the entire circumference of the sock. Accordingly, to the extent necessary, the operation is repeated on those portions of the circumference of the sock that did not experience the first welding operation.

It will be understood that the presence of the electrically conductive member 40 prevents opposite faces of the sock 10 from becoming welded to each other. Because the resistivity of the electrically conductive member is lower than that of the material of the sock, the member and sock do not become welded to each other.

Figure 3:
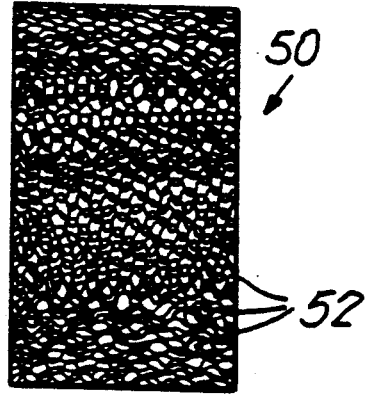
FIG. 3 is a transverse cross-section of a slag filter according to the current invention, taken along line 3—3 of FIG. 4.
Figure 4:
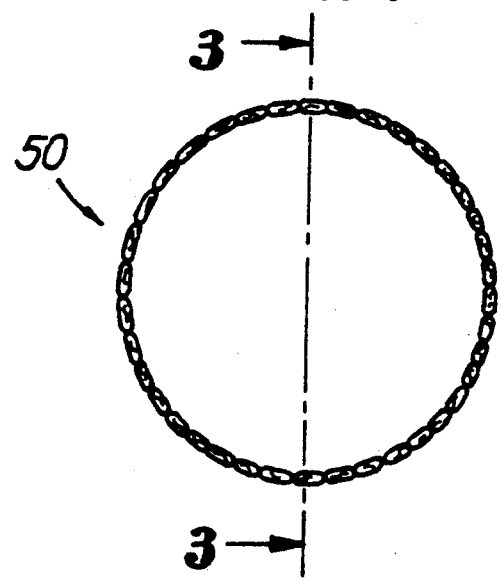
FIG. 4 is an end view of the filter of FIG. 3.

After the bonding operation has been performed around the circumference of the sock 10, the sock is compressed to the desired size and shape of the product to be made. FIGS. 3 and 4 show a final product in the form of a slag filter 50 for an automotive airbag assembly.

FIGS. 1, 3 and 4 are drawn approximately to the same scale. It may be seen that the sock 10 has been compressed longitudinally to a considerable extent. Typically, a certain amount of incidental radial expansion might occur. Preferably, the sock is compressed by more than fifty percent of its original longitudinal dimension, and more preferably by about seventy to seventy-five percent for the production of an airbag slag filter 50. With the preferred stainless steel composition and Jersey knit recited above, the mesh sock is preferably compressed to a weight density of about twenty percent that of the same metal as a solid.

As may best be seen in FIG. 3, the loops of the knit are compressed in a substantially random fashion, leaving openings 52. Accordingly, the filter is a substantially cylindrical foraminous article that is free of unbonded tinkles and that is suitable for use as a slag filter in an automotive airbag assembly. In use, as a result of the design of the airbag assembly, slag will pass radially through the mesh of the filter, usually from the inside out.

The compression step may be carried out using any suitable conventional apparatus. The above-cited patent application Ser. No. 07/661,282 broadly discloses suitable apparatus and method. It will be understood that the said patent application discloses a method and apparatus for the production of a product that is different from the simpler product disclosed and claimed herein. Those skilled in the art will know how to change the shape of the compression die to accomplish the invention disclosed and claimed herein.

A latitude of modification, change and substitution is intended in the foregoing disclosure and in some instances some features of the invention will be used without a corresponding use of other features. Accordingly, it is appropriate that the appended claims be construed broadly and in a manner consistent with the scope of the invention therein.

What is claimed is:

1. A filter suitable for the brief, one-time filtering of gas-laden molten metal, the filter consisting essentially of a sock of knitted metallic wire mesh that has been compressed at least longitudinally by more than fifty percent of its original longitudinal dimension, the filter being a substantially cylindrical foraminous article having tinkles therein, each tinkle being affixed to the compressed metallic mesh by a bond.

2. The filter of claim 1, the mesh having been compressed to a weight density of about twenty percent that of the same metal as a solid.

* * * * *